United States Patent
Cao et al.

(10) Patent No.: US 11,659,532 B2
(45) Date of Patent: *May 23, 2023

(54) USER EQUIPMENT, NETWORK DEVICE, AND DATA TRANSMISSION METHOD

(71) Applicant: HUAWEI TECHNOLOGIES CO., LTD., Guangdong (CN)

(72) Inventors: Zhenzhen Cao, Beijing (CN); Hong Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/800,380

(22) Filed: Feb. 25, 2020

(65) Prior Publication Data
US 2020/0196314 A1    Jun. 18, 2020

Related U.S. Application Data

(63) Continuation of application No. 15/892,883, filed on Feb. 9, 2018, now Pat. No. 10,595,316, which is a
(Continued)

(51) Int. Cl.
*H04W 72/04* (2023.01)
*H04W 72/0453* (2023.01)
(Continued)

(52) U.S. Cl.
CPC ....... *H04W 72/0453* (2013.01); *H04W 72/04* (2013.01); *H04W 72/21* (2023.01); *H04W 72/23* (2023.01); *H04W 72/52* (2023.01)

(58) Field of Classification Search
CPC ........... H04W 72/0453; H04W 72/042; H04W 72/0486; H04W 72/0413; H04W 72/04; H04W 72/1284
See application file for complete search history.

(56) References Cited

U.S. PATENT DOCUMENTS

2012/0207100 A1* 8/2012 Hakola ............... H04W 76/14
                                                        370/329
2015/0111587 A1* 4/2015 Kalhan ............... H04W 72/04
                                                        455/450
(Continued)

FOREIGN PATENT DOCUMENTS

CN    103650622    3/2014
CN    104378825    2/2015
(Continued)

OTHER PUBLICATIONS

3GPP TS 36.300 V13.0.0 3rd Generation Partnership Project, Technical Specification Group Radio Access Network, Evolved Universal Terrestrial Radio Access (E-UTRA) and Evolved Universal Terrestrial Radio Access Network (EUTRAN), Overall description;Stage 2 (Release 13), Technical Specification, Jun. 2015, 254 pages.
(Continued)

*Primary Examiner* — Lakeram Jangbahadur
(74) *Attorney, Agent, or Firm* — Fish & Richardson P.C.

(57) ABSTRACT

The present disclosure is directed to a D2D data transfer method, and user equipment and a network device that use the method. In one method, user equipment determines a logical channel used for to-be-transmitted Device to Device (D2D) data. The user equipment determines a logical channel group corresponding to the logical channel. The user equipment reports, to a network device, a D2D data volume of the logical channel group for the user equipment. The user equipment sends, on a D2D resource that is allocated by the network device to the user equipment according to the D2D data volume, the to-be-transmitted D2D data to another user equipment by using the determined logical channel.

8 Claims, 4 Drawing Sheets

Related U.S. Application Data continuation of application No. PCT/CN2015/086778, filed on Aug. 12, 2015.

(51) Int. Cl.
*H04W 72/21* (2023.01)
*H04W 72/23* (2023.01)
*H04W 72/52* (2023.01)

(56) References Cited

U.S. PATENT DOCUMENTS

| | | | | |
|---|---|---|---|---|
| 2015/0334714 | A1* | 11/2015 | Wang | H04W 72/0473 370/329 |
| 2016/0044678 | A1* | 2/2016 | Kwon | H04W 72/0453 370/329 |
| 2016/0183239 | A1 | 6/2016 | Lee et al. | |
| 2017/0006649 | A1 | 1/2017 | Zhao et al. | |
| 2017/0171837 | A1* | 6/2017 | Chen | H04W 72/04 |
| 2017/0230939 | A1* | 8/2017 | Rudolf | H04W 4/70 |
| 2017/0303319 | A1* | 10/2017 | Han | H04W 72/0406 |
| 2018/0167945 | A1 | 6/2018 | Cao et al. | |

FOREIGN PATENT DOCUMENTS

| | | |
|---|---|---|
| CN | 104469961 | 3/2015 |
| CN | 104768206 | 7/2015 |
| CN | 104811892 | 7/2015 |
| EP | 3101969 | 12/2016 |
| KR | 20150028693 | 3/2015 |
| WO | 2012160510 | 11/2012 |
| WO | 2015003820 | 1/2015 |
| WO | 2015020356 | 2/2015 |
| WO | 2015113398 | 8/2015 |

OTHER PUBLICATIONS

3GPP TS 36.321 V12.6.0 3rd Generation Partnership Project, Technical Specification Group Radio Access Network, Evolved Universal Terrestrial Radio Access (E-UTRA), Medium Access Control (MAC) protocol specification (Release 12), Technical Specification, Jun. 2015, 77 pages.

3GPP TS 36.331 V12.6.0 3rd Generation Partnership Project, Technical Specification Group Radio Access Network, Evolved Universal Terrestrial Radio Access (E-UTRA), Radio Resource Control (RRC), Protocol specification(Release 12), Technical Specification,Jun. 2015, 449 pages.

Ericsson, "Resource allocation for D2D transmitters in coverage", 3GPP TSG-RAN WG2 #85 Tdoc R2-140625, Feb. 10-14, 2014, 5 pages.

Extended European Search Report issued in European Application No. 15900755.8 dated Jun. 14, 2018, 9 pages.

Huawei, HiSilicon,"Priority handling based on Prose Per Packet Priority" 3GPP TSG-RAN WG2 Meeting #92, R.2-156533, Anaheim, US, Nov. 16-20, 2015, 4 pages.

InterDigital Communications,"Group Priorities for Prose Communications" 3GPP TSG-RAN WG2 #90, R.2-152679, Fukuoka, Japan, May 25-29, 2015, 6 pages.

International Search Report and Written Opinion in International Application No. PCT/CN2015/086778, dated Apr. 28, 2016, 17 pages.

Korean Office Action issued in Korean Application No. 10-2018-7004024 dated Jan. 21, 2019, 12 pages.

InterDigital Communications.,"Priority handling for D2D communications", 3GPP TSG-RAN WG1 Meeting #81, R.1-153374, Fukuoka, Japan, May 25-29, 2015, 5 pages.

Motorola Mobility,"Device to Device direct Communication",3GPP TSG-RAN WG2#83, R-2-132467, Barcelona, Spain, Aug. 19-23, 2013, 14 pages.

Office Action issued in Japanese Application No. 2018-503760 dated Jan. 25, 2019, 11 pages.

R.1-141139 Huawei, HiSilicon,""Resource allocation for mode-1 communication"",3GPP TSG RAN WG1 Meeting #76bis, R-1-141139,Shenzhen, China, Mar. 31-Apr. 4, 2014, 3 pages.

* cited by examiner

USER EQUIPMENT, NETWORK DEVICE, AND DATA TRANSMISSION METHOD

CROSS-REFERENCE TO RELATED APPLICATION

This application is a continuation of U.S. patent application Ser. No. 15/892,883, filed on Feb. 9, 2018, which is a continuation of International Application No. PCT/CN2015/086778, filed on Aug. 12, 2015. All of the afore-mentioned patent applications are hereby incorporated by reference in their entireties.

TECHNICAL FIELD

This application relates to the field of wireless communications, and in particular, to user equipment, a network device, and a data transmission method.

BACKGROUND

In conventional cellular wireless communications technologies, user equipment communicates with a base station by using an air interface, and the base station forwards user data to a destination node in a network.

With development of mobile communications technologies, to better satisfy a user requirement, and improve efficiency of information exchange between user equipments, a mechanism for direct communication between user equipments, that is, D2D communication (Device to Device Communication), which is also referred to as sidelink communication, is introduced to a Long Term Evolution (LTE for short) system. Different from the conventional cellular wireless communications technologies, data of user equipment is directly transmitted by using an air interface between user equipments without needing to be transmitted by using a base station; therefore, a network forwarding delay is reduced. In a D2D communication mode, a direct communications link between user equipments may be established under the control of or with the assistance of a network device, such as a base station. A typical application scenario of the D2D communication is a public safety scenario. For example, for communication between firefighters, a typical service type is a voice service.

Figure 1:
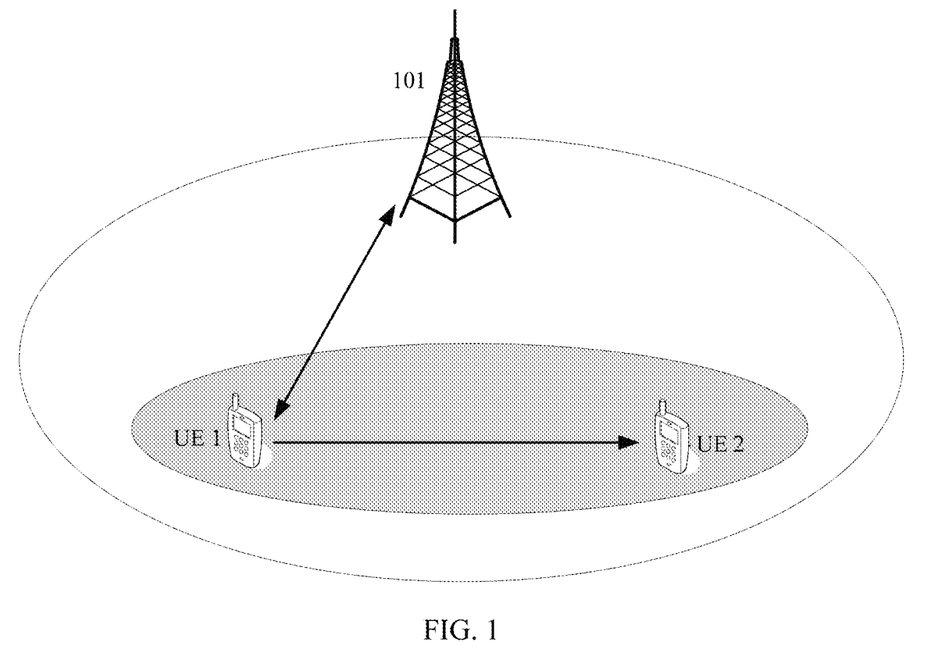
FIG. 1 is a schematic diagram of a D2D transmission system in the prior art of the present invention.

As shown in FIG. 1, a D2D communications system includes a base station 101, user equipment (UE) 1, and UE 2. Cellular wireless communication may be performed between the base station 101 and the UE 1. D2D communication may be performed between the UE 1 and the UE 2.

Figure 2:
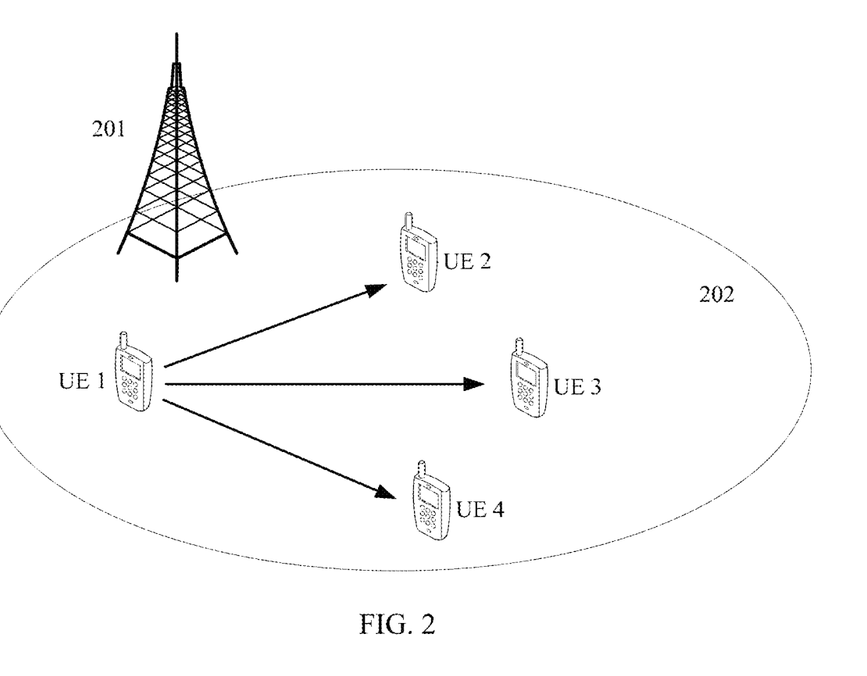
FIG. 2 is a schematic diagram of one-to-many D2D transmission in the prior art of the present invention.

Current D2D communication supports group communication, that is, one-to-many communication. D2D user equipment may send D2D data to user equipments of a communication group. As shown in FIG. 2, a base station 201 controls or assists UE 1, UE 2, UE 3, and UE 4 to establish D2D group communication. For example, a group 202 is a public safety group, and the UE 1 may directly transmit data to the UE 2, the UE 3, and the UE 4 without using the base station.

The current D2D communication also supports unicast communication, that is, one-to-one communication. D2D user equipment directly sends D2D data to another user equipment.

However, because a transmission resource is obtained by user equipment through contention, a current D2D communications system may have problems of insufficiently timely and reliable transmission of data, or the like because some user equipments cannot obtain resources through contention.

Because of an inherent disadvantage of a D2D communications manner in an existing wireless communications system, a novel D2D data transmission method and device are urgently needed in this field, so as to resolve the problems of insufficiently timely and reliable transmission of some data, or the like in the current D2D communications system.

SUMMARY

Embodiments of the present invention provide a data transmission method and a device, which can ensure timeliness and reliability of transmission of some data in D2D communication.

According to a first aspect, a data transmission method includes:

determining, by user equipment, a logical channel used for to-be-transmitted D2D data;

determining, by the user equipment, a logical channel group corresponding to the logical channel;

reporting, by the user equipment, a D2D data volume of the user equipment that is in the logical channel group to a network device; and sending, by the user equipment, on a D2D resource that is allocated by the network device to the user equipment according to the D2D data volume, the to-be-sent D2D data to another user equipment by using the determined logical channel.

With reference to the first aspect, in the method, the determining, by user equipment, a logical channel used for to-be-transmitted D2D data includes:

determining, according to first configuration information and a type of the to-be-transmitted D2D data, the logical channel used for the to-be-transmitted D2D data, where the first configuration information includes a correspondence between the logical channel and the type of the to-be-transmitted D2D data.

With reference to the first aspect, in the method, the first configuration information is stored in the user equipment; or the first configuration information is received by the user equipment from the network device, and the first configuration information is determined by the network device according to the type of the D2D data.

With reference to the first aspect, in the method, the determining, by the user equipment, a logical channel group corresponding to the logical channel includes:

determining, by the user equipment according to second configuration information and a type of the logical channel, the logical channel group used by the logical channel, where the second configuration information includes a correspondence between the logical channel group and the type of the logical channel.

With reference to the first aspect, in the method, the second configuration information is stored in the user equipment; or the second configuration information is received by the user equipment from the network device, and the second configuration information is determined by the network device according to the type of the logical channel.

With reference to the first aspect, in the method, before the determining, by the user equipment, a logical channel group corresponding to the logical channel, the method includes:

sending, by the user equipment, type information of the logical channel to the network device; and receiving, by the user equipment, the second configuration information sent by the network device, where the second configuration information is determined by the network device according to the type of the logical channel that is sent by the user equipment; and the determining, by the user equipment, a logical channel group corresponding to the logical channel includes:

determining, by the user equipment according to the second configuration information, the logical channel group corresponding to the logical channel.

With reference to the first aspect, in the method, the type of the logical channel includes at least one of the following: an identifier of the logical channel, a priority of the logical channel, or a priority of data transmitted on the logical channel.

With reference to the first aspect, in the method, the type of the to-be-transmitted D2D data includes: a priority of the D2D data and/or a service type of the D2D data.

With reference to the first aspect, in the method, the reporting, by the user equipment, a D2D data volume of the user equipment that is in the logical channel group to a network device includes: performing reporting by using a BSR.

With reference to the first aspect, in the method, the D2D resource allocated to the user equipment falls within an uplink transmission resource range, or falls outside an uplink transmission resource range.

With reference to the first aspect, in the method, the D2D resource is a D2D resource that is allocated by the network device to the user equipment according to the D2D data volume and at least one of the type of the D2D data or a group number of the logical channel group.

According to a second aspect, a data transmission method includes:

receiving, by a network device, a D2D data volume of user equipment that is in a logical channel group and that is reported by the user equipment, where the logical channel group includes a logical channel that is used by the user equipment to send to-be-transmitted D2D data;

allocating, by the network device, a D2D resource to the user equipment according to the D2D data volume; and sending, by the network device, information about the allocated D2D resource to the user equipment, where the D2D resource is used by the user equipment to send the to-be-transmitted D2D data to another user equipment.

With reference to the second aspect, in the method, before the receiving, by a network device, the D2D data volume, the method further includes:

configuring, by the network device according to types of D2D data in the D2D system, a logical channel for each type of D2D data; and sending, by the network device, first configuration information to the user equipment, where the first configuration information includes a correspondence between each type of D2D data and the logical channel; or configuring, by the network device, a logical channel for D2D data of each user equipment in the D2D system according to types of D2D data in the D2D system and types of user equipments in the D2D system; and sending, by the network device, first configuration information to the user equipment, where the first configuration information includes a correspondence between each type of D2D data of the user equipment and the logical channel.

With reference to the second aspect, in the method, before the receiving, by a network device, the D2D data volume, the method further includes:

configuring, by the network device, a logical channel group for each type of logical channel according to types of logical channels in the D2D system; and sending, by the network device, second configuration information to the user equipment, where the second configuration information includes a correspondence between each type of logical channel and the logical channel group; or configuring, by the network device, a logical channel group for a logical channel of each user equipment in the D2D system according to types of logical channels in the D2D system and the types of the user equipments in the D2D system; and sending, by the network device, second configuration information to the user equipment, where the second configuration information includes a correspondence between each type of logical channel of the user equipment and the logical channel group.

With reference to the second aspect, in the method, before the receiving, by a network device, the D2D data volume, the method further includes:

receiving, by the network device, type information of the logical channel that is sent by the user equipment;

configuring, by the network device, a logical channel group for the logical channel of the user equipment according to the type information of the logical channel that is sent by the user equipment, or according to the type information of the logical channel that is sent by the user equipment and a type of the user equipment; and sending, by the network device, second configuration information to the user equipment, where the second configuration information includes a correspondence between each type of logical channel of the user equipment and a logical channel group.

With reference to the second aspect, in the method, the type of the logical channel includes at least one of the following: an identifier of the logical channel, a priority of the logical channel, or a priority of data transmitted on the logical channel.

With reference to the second aspect, in the method, the type of the D2D data includes: a priority of the D2D data and/or a service type of the D2D data.

With reference to the second aspect, in the method, determining, by the network device, a resource that can be used for D2D communication, and determining that the resource falls within an uplink transmission resource range, or falls outside an uplink transmission resource range.

With reference to the second aspect, in the method, the receiving, by a network device, a D2D data volume reported by the user equipment includes: receiving, by the network device, the D2D data volume that is reported by the user equipment by using a BSR.

With reference to the second aspect, in the method, the allocating, by the network device, a D2D resource to the user equipment according to the D2D data volume includes: allocating, by the network device, the D2D resource to the user equipment according to the D2D data volume and at least one of the type of the D2D data or a group number of the logical channel group.

According to a third aspect, user equipment includes a storage unit, a processing unit, a sending unit, and a receiving unit, where:

the storage unit is configured to store to-be-transmitted D2D data;

the processing unit is configured to: determine a logical channel used for the to-be-transmitted D2D data, determine a logical channel group corresponding to the logical channel, determine a volume of the D2D data that needs to be sent by the user equipment in the logical channel group, and determine, according to information, received by the receiving unit, about a D2D resource, a resource that can be used to send the to-be-transmitted D2D data;

the sending unit is configured to: report the D2D data volume determined by the processing unit to a network device, and send, on the resource determined by the processing unit, the to-be-transmitted D2D data to another user equipment by using the logical channel determined by the processing unit; and the receiving unit is configured to: receive information about the D2D resource that is allocated by the network device to the user equipment according to the D2D data volume, and transfer the information about the D2D resource to the processing unit.

With reference to the third aspect, for the user equipment, the processing unit being configured to determine a logical channel used for the to-be-transmitted D2D data includes: being configured to determine, according to first configuration information and a type of the to-be-transmitted D2D data, the logical channel used for the to-be-transmitted D2D data, where the first configuration information includes a correspondence between the logical channel and the type of the to-be-transmitted D2D data.

With reference to the third aspect, for the user equipment, the first configuration information is stored in the storage unit; or the receiving unit is further configured to receive the first configuration information from the network device, and the first configuration information is determined by the network device according to the type of the D2D data.

With reference to the third aspect, for the user equipment, the processing unit being configured to determine a logical channel group corresponding to the logical channel includes: being configured to determine, according to second configuration information and type information of the logical channel, the logical channel group used by the logical channel, where the second configuration information includes a correspondence between the logical channel group and a type of the logical channel.

With reference to the third aspect, for the user equipment, the second configuration information is stored in the storage unit; or the receiving unit is further configured to receive the second configuration information from the network device, and the second configuration information is determined by the network device according to the type of the logical channel.

With reference to the third aspect, for the user equipment, before the processing unit determines the logical channel group corresponding to the logical channel, the sending unit is further configured to send the type information of the logical channel to the network device; and the receiving unit is further configured to receive the second configuration information sent by the network device, where the second configuration information is determined by the network device according to the type of the logical channel that is sent by the user equipment; and the processing unit being configured to determine a logical channel group corresponding to the logical channel includes: determining, according to the second configuration information, the logical channel group corresponding to the logical channel.

With reference to the third aspect, for the user equipment, the type of the logical channel includes at least one of the following: an identifier of the logical channel, a priority of the logical channel, or a priority of data transmitted on the logical channel.

With reference to the third aspect, for the user equipment, the type of the to-be-transmitted D2D data includes: a priority of the D2D data and/or a service type of the D2D data.

With reference to the third aspect, for the user equipment, the sending unit being configured to report the D2D data volume determined by the processing unit to a network device includes: reporting the D2D data volume to the network device by using a BSR.

With reference to the third aspect, for the user equipment, the D2D resource allocated to the user equipment falls within an uplink transmission resource range, or falls outside an uplink transmission resource range.

With reference to the third aspect, for the user equipment, the D2D resource is a D2D resource that is allocated by the network device to the user equipment according to the D2D data volume and at least one of the type of the D2D data or a group number of the logical channel group.

According to a fourth aspect, a network device is applicable to a D2D system, and includes:

a receiving unit, configured to receive a D2D data volume of user equipment that is in a logical channel group and that is reported by the user equipment, where the logical channel group includes a logical channel that is used by the user equipment to send to-be-transmitted D2D data;

a processing unit, configured to allocate a D2D resource to the user equipment according to the D2D data volume received by the receiving unit; and a sending unit, configured to send, to the user equipment, information about the D2D resource allocated by the processing unit, where the D2D resource is used by the user equipment to send the to-be-transmitted D2D data to another user equipment.

With reference to the fourth aspect, for the network device, before the receiving unit receives the D2D data volume, the processing unit is further configured to: configure, according to types of D2D data in the D2D system, a logical channel for each type of D2D data, and generate first configuration information, where the first configuration information includes a correspondence between each type of D2D data and the logical channel; and correspondingly, the sending unit is further configured to send the first configuration information generated by the processing unit to the user equipment; or before the receiving unit receives the D2D data volume, the processing unit is further configured to: configure a logical channel for D2D data of each user equipment in the D2D system according to types of D2D data in the D2D system and types of user equipments in the D2D system, and generate first configuration information, where the first configuration information includes a correspondence between each type of D2D data of the user equipment and the logical channel; and correspondingly, the sending unit is further configured to send the first configuration information generated by the processing unit to the user equipment.

With reference to the fourth aspect, for the network device, before the receiving unit receives the D2D data volume, the processing unit is further configured to: configure a logical channel group for each type of logical channel according to types of logical channels in the D2D system, and generate second configuration information, where the second configuration information includes a correspondence between each type of logical channel and the logical channel group; and correspondingly, the sending unit is further configured to send the second configuration information generated by the processing unit to the user equipment; or before the receiving unit receives the D2D data volume, the processing unit is further configured to: configure a logical channel group for a logical channel of each user equipment in the D2D system according to types of logical channels in the D2D system and the types of the user equipments in the D2D system, and generate second configuration information, where the second configuration information includes a correspondence between each type of logical channel of the user equipment and the logical channel group; and correspondingly, the sending unit is further configured to send the second configuration information generated by the processing unit to the user equipment.

With reference to the fourth aspect, for the network device, before the receiving unit receives the D2D data volume, the receiving unit is further configured to receive type information of the logical channel that is sent by the user equipment; and the processing unit is further configured to: configure a logical channel group for the logical channel of the user equipment according to the type information of the logical channel that is sent by the user equipment, or according to the type information of the logical channel that is sent by the user equipment and a type of the user equipment, and generate second configuration information, where the second configuration information includes a correspondence between each type of logical channel of the user equipment and a logical channel group.

With reference to the fourth aspect, for the network device, the type of the logical channel includes at least one of the following: an identifier of the logical channel, a priority of the logical channel, or a priority of data transmitted on the logical channel.

With reference to the fourth aspect, for the network device, the type of the D2D data includes: a priority of the D2D data and/or a service type of the D2D data.

With reference to the fourth aspect, for the network device, the processing unit determines a resource that can be used for D2D communication, and determines that the resource falls within an uplink transmission resource range, or falls outside an uplink transmission resource range.

With reference to the fourth aspect, for the network device, the receiving, by a receiving unit, a D2D data volume reported by the user equipment includes: receiving, by the receiving unit, the D2D data volume that is reported by the user equipment by using a BSR.

With reference to the fourth aspect, for the network device, the processing unit being configured to allocate a D2D resource to the user equipment according to the D2D data volume includes: allocating the D2D resource to the user equipment according to the D2D data volume and at least one of the type of the D2D data or a group number of the logical channel group.

According to the D2D data transmission method and the devices in the embodiments of the present invention, in a D2D communications system, user equipment configures that D2D data of different types uses a logical channel corresponding to a data type, and configures different logical channel groups for the logical channels. After the user equipment reports a D2D data volume corresponding to a corresponding logical channel to a network device, the network device allocates a D2D resource to the user equipment. In this way, the network device can configure a resource according to a data type of the user equipment, so that some D2D data can be accurately sent in a timely manner, thereby improving reliability of the system.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Although descriptions are provided above in the background by using an LTE system as an example, a person skilled in the art should understand that the present invention not only is applicable to the LTE system, but also may be applicable to another wireless communications system, such as a GSM, a UMTS, a CDMA, or a new network system. Specific embodiments are described below by using the LTE system as an example.

In D2D communication, different D2D data sent by different user equipments may have different degrees of urgency. For example, in a public safety scenario, if an unexpected situation occurs currently, one of users may need to notify the unexpected situation to other users by using voice in a timely manner. Therefore, a priority of voice data may be higher than that of common file data. Moreover, significance of different user equipments may differ. For example, a success rate and timeliness of sending a D2D data by a group leader of a D2D group by using user equipment should be higher than those of another user equipment.

In the prior art, data is not prioritized in the D2D communication, and D2D data of different priorities are on a same logical channel. Therefore, user equipment cannot preferentially send D2D data of a higher priority, and consequently, quality of service (QoS) of the data of a higher priority cannot be ensured.

In view of the foregoing analysis, the embodiments of the present invention provide technical solutions in which preferential sending of data of a higher priority can be ensured. The technical solutions of the present invention are described in detail below.

Network elements involved in the present invention include:

user equipment, configured to: send uplink data and D2D data, receive downlink data sent by a base station, and receive D2D data sent from another UE; and a network device, configured to: schedule uplink data transmission and D2D transmission of the user equipment, receive and process the uplink data sent by the user equipment, and schedule and send the downlink data of the user equipment.

A person skilled in the art should understand that the user equipment in the present invention may be a device such as a user terminal, a terminal device, or a mobile station, and the user equipment may be relay user equipment (relay UE). The network device in the present invention may be a base station or a core network device.

Embodiment 1

An idea of this embodiment is: user data of different types is allocated to and transmitted on a corresponding logical channel, the logical channel is allocated to a logical channel group, user equipment reports a data volume of the corresponding logical channel group according to information about the logical channel group, and a network device allocates a D2D resource to the user equipment according to the data volume carried in the logical channel group.

Figure 3:
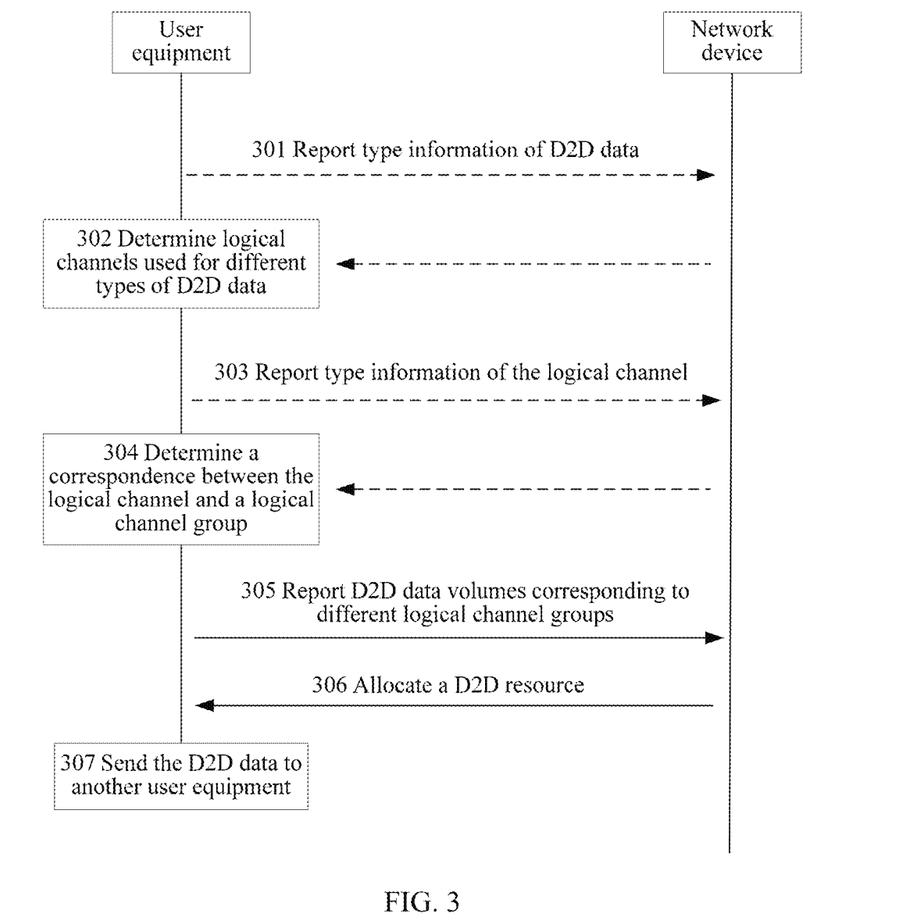
FIG. 3 is a schematic flowchart of a method for allocating a D2D communications resource according to an embodiment of the present invention.

The technical solution of Embodiment 1 of the present invention is described below with reference to FIG. 3.

The technical solution of this embodiment includes the following steps:

Step 301: User equipment reports, to a network device, type information of D2D data that is to be transmitted by the user equipment.

Step 302: The user equipment determines a corresponding logical channel used for the to-be-transmitted D2D data.

Step 303: The user equipment reports, to the network device, type information of the logical channel that is determined in step 302 by the user equipment.

Step 304: The user equipment determines a correspondence between the logical channel and a logical channel group.

Step 305: The user equipment reports, to the network device according to information about the logical channel group and the D2D data to be transmitted by the user equipment, a D2D data volume corresponding to the corresponding logical channel group.

Step 306: The network device allocates a D2D resource to the user equipment according to the D2D data volume corresponding to the logical channel group.

Step 307: The user equipment sends, on the D2D resource that is allocated by the network device to the user equipment, the to-be-sent D2D data to another user equipment by using the logical channel determined in step 302.

The type information of the D2D data includes a service type and/or a priority type, or the like.

The service type generally includes the following service types: a voice service, a data file service, an SMS message service, or the like. The voice service is generally urgent, and therefore a priority of voice service data is the highest. The data file service is generally less urgent than the voice service, and therefore a priority of the data file service is intermediate. The SMS message service does not have a high requirement on timeliness, and therefore a priority of SMS message service data is the lowest.

For the priority type, a particular quantity of different priorities of D2D data may be predefined in a system. A specific quantity of the priorities may be adjusted and changed according to a service carried in the system and a type of user equipment. Information about the priorities may be classified into: a priority 1, a priority 2, . . . , and a priority N, where N is an integer greater than 1. A smaller priority value may indicate a higher priority of the information. Alternatively, certainly, a larger priority value may indicate a higher priority. Specifically, the quantity of the priorities may be set to N=16. A person skilled in the art should understand that the quantity may be set to another number according to a specific application scenario, which is not described in detail herein.

A priority of D2D data may vary according to different user equipments. In a specific example, if the quantity of the priorities is N=16, and a smaller priority value indicates a higher priority of information, a priority of data sent by important user equipment may be a priority 1, a priority of data sent by common user equipment may be a priority 4, and a priority of data sent by unimportant user equipment may be a priority 8.

A priority of data may be determined according to both a user equipment type and a service type carried in the data. Higher importance of a terminal and a more urgent service type that is carried in data to be sent by the terminal indicate a higher priority of data that is sent by the user equipment currently, and vice versa. For example, a priority of voice service data sent by common user equipment is 3, and a priority of a data file service sent by important user equipment is 7. A voice service of the common user equipment is more urgent; therefore, the priority of the data is higher than a priority of a non-urgent service sent by the important user equipment.

Settings of priorities of all the foregoing service data of different types and settings of priorities of data of all the foregoing different user equipments may be agreed on by both the user equipment and the network device in advance, and stored in the user equipment and the network device.

Logical channels that can be used when all the foregoing D2D data of different types is transmitted, and priorities of the logical channels may be agreed on by both the user equipment and the network device in advance, and stored in the user equipment and the network device.

In the foregoing step 301 of reporting, by user equipment to a network device, type information of D2D data that is to be sent by the user equipment, in step 301, the user equipment may report type information of only each to-be-sent data service that is already temporarily stored by the user equipment in a send buffer to the network device.

In addition, step 301 may be omitted in an actual application. That is, the user equipment may not report, to the network device, the type information of the D2D data that is to be sent by the user equipment. Alternatively, because of a transmission error, the type information reported by the user equipment is not received by the network device. In this case, because all types of D2D data are already defined in the system, the network device may know all possible types of D2D data to be transmitted by particular user equipment. In this case, the network device may allocate a logical channel to each type of D2D data.

In the foregoing step 302, the user equipment may determine the logical channel for only the to-be-sent D2D data, or may determine logical channels that correspond to all types of D2D data supported by the user equipment.

The user equipment may allocate D2D data of different types to different logical channels or a same logical channel according to a resource status of the system and a specific application environment.

In a case in which the type of the D2D data is a service type, for example, a voice service, a data file service, and an SMS message service may be separately allocated to a logical channel, where D2D data of the voice service is allocated to a logical channel group 1, D2D data of the data file service is allocated to a logical channel group 2, and D2D data of the SMS message service is allocated to a logical channel group 3. Alternatively, a voice service may be allocated to a logical channel, and a data file service and an SMS message service may be allocated to a logical channel. Certainly, another logical channel allocation manner may be used, or a logical channel allocation manner for the service type may be a fixed allocation manner, which is not described in detail herein.

In a case in which the type of the D2D data is a priority type, for example, a quantity of priorities may be set to 16. If all user equipments perform step 301, assuming that data sent by the foregoing multiple user equipments that is received by the network device has only eight priorities in total, eight logical channels may be allocated, and one logical channel is allocated to each to-be-sent D2D data of a different priority. If none of user equipments performs step 301 or some user equipments do not perform step 301, the network device can determine that D2D data that may be sent by all the user equipments has 16 priorities in total. Therefore, the network device may configure 16 logical channels, and allocate one logical channel to D2D data of each possible priority. A specific correspondence between logical channels and priorities may be: D2D data of a priority 1 uses a logical channel 1, D2D data of a priority 2 uses a logical channel 2, . . . , and D2D data of a priority N uses a logical channel N. A person skilled in the art should understand that another quantity of logical channels, and another correspondence between priorities and logical channels may be set according to a specific application scenario, or an allocation manner of priorities and logical channels may be a fixed allocation manner, which is not described in detail herein.

The logical channel allocation manner may include a correspondence between a type of the to-be-transmitted D2D data and the logical channel, or may include a correspondence between all types of D2D data and logical channels. The allocation manner may be specifically set in first configuration information, and the first configuration information is stored in the user equipment.

The foregoing example describes a case in which the first configuration information is stored in the user equipment. An example in this paragraph is to describe that the first configuration information is sent by the network device to the user equipment. The network device may send the first configuration information by using a system broadcast message and/or dedicated signaling according to a resource status of the system and a specific application environment, to inform the user equipment of logical channels used for D2D data of different types. After receiving the first configuration information sent by the network device, the user equipment may determine, with reference to the first configuration information and a status of the user equipment, the logical channels used for the D2D data of different types. In addition, in a case in which the user equipment performs step 301, the network device may learn service types of D2D data of all user equipments performing step 301. In this way, according to a type, reported by the user equipment, of the D2D data, the network device sends the first configuration information to the user equipment, and allocates the logical channel to the type of D2D data reported by the user equipment. In this case, the first configuration information may include an identifier of the allocated logical channel, such as a number of the logical channel. In a case in which the first configuration information is sent by the network device to the user equipment, the network device may further determine the first configuration information according to a type of the user equipment. For example, the user equipment may be classified as an advanced user, a common user, a low-level user, or the like, and different logical channels are allocated to different types of user equipment. In addition, the network device may also allocate the logical channel with reference to a user type and the type of the D2D data.

In the foregoing step 303, the type information of the logical channel includes at least one of the following information: an identifier (such as a logical channel number) of the logical channel, a priority of the logical channel, or a priority of data transmitted on the logical channel.

In step 303, the user equipment may report, to the network device, type information of a logical channel used by only each data service to be sent by the user equipment.

In addition, step 303 may be omitted in an actual application. That is, the user equipment may not report, to the network device, the type information of the logical channel used for the D2D data that is to be sent by the user equipment. Alternatively, because of a transmission error, the type information of the logical channel that is reported by the user equipment is not received by the network device. In this case, because logical channels that can be used when all types of D2D data is transmitted are already defined in the system, the network device may know logical channels that are to be used for all possible types of D2D data to be transmitted by particular user equipment. In this case, the network device may allocate a logical channel group to each type of logical channel.

In the foregoing step 304, the user equipment determines a correspondence between the logical channel and a logical channel group. By using matching the logical channel with the logical channel group, the user equipment may report a D2D buffer status report (BSR for short) to the network device by using a logical channel group identifier of the logical channel group.

In step 304, the logical channel group is allocated to the logical channel according to the type information of the logical channel, that is, a type of the D2D data carried in the logical channel and/or an identifier of the logical channel. Specifically, if a logical channel is allocated to each type of D2D data in step 302, in step 304, the following operation may be performed: the foregoing logical channels are allocated to different logical channel groups according to D2D data of different types carried in the logical channels.

In a case in which the type of the D2D data is a service type, for example, a logical channel 1 that carries D2D data of a relatively urgent voice service is allocated to a logical channel group 1, and a logical channel 2 that carries a less urgent data file service and a logical channel 3 that carries a less urgent SMS message service are allocated to a logical channel group 2. A person skilled in the art should understand that another quantity of logical channel groups, and another correspondence between logical channels and logical channel groups may be set according to a specific application scenario, or an allocation manner of grouping logical channels may be a fixed allocation manner, and details are not described herein.

In a case in which the type of the D2D data is a priority type, specifically, if in step 302, the network device configures 16 logical channels, and allocates one logical channel to D2D data of each priority, but a quantity of the logical channel group is less than a quantity of logical channels, for example, the quantity of the logical channel groups may be 4, in step 304, the network device may perform the following operations: configuring D2D data of priorities of 1 to 4, that is, logical channels 1 to 4, to correspond to a logical channel group 1; configuring D2D data of priorities of 5 to 8, that is, logical channels 5 to 8, to correspond to a logical channel group 2; configuring D2D data of priorities of 9 to 12, that is, logical channels 9 to 12, to correspond to a logical channel group 3; and configuring D2D data of priorities of 13 to 16, that is, logical channels 13 to 16, to correspond to a logical channel group 4. A person skilled in the art should understand that another quantity of logical channel groups, and another correspondence between logical channels and logical channel groups may be set according to a specific application scenario, or an allocation manner of grouping logical channels may be a fixed allocation manner, and details are not described herein.

An allocation manner of the logical channel group may include the correspondence between the logical channel group and the logical channel, and may be set in second configuration information. The second configuration information is stored in the user equipment.

The foregoing example describes a case in which the second configuration information is stored in the user equipment. An example in this paragraph is to describe that the second configuration information is sent by the network device to the user equipment. The network device may send the second configuration information by using a system broadcast message and/or dedicated signaling according to a resource status of the system and a specific application environment, to inform the user equipment of logical channel groups used by different logical channels. After receiving the second configuration information sent by the network device, the user equipment may determine, with reference to the second configuration information and a status of the user equipment, the logical channel groups used by the different logical channels. In addition, in a case in which the user equipment performs step 303, the network device may learn type information of logical channels of all user equipments performing step 303. In this way, according to the type information of the logical channel reported by the user equipment, the network device sends the second configuration information to the user equipment by using a system broadcast message and/or dedicated signaling, and allocates the logical channel group to the type of D2D data reported by the user equipment. In this case, the second configuration information includes a group number of the configured logical channel group. In a case in which the second configuration information is sent by the network device to the user equipment, the network device may further refer to a type of the user equipment. For example, the user equipment may be classified as an advanced user, a common user, or a low-level user, and different logical channel groups are allocated to different types of user equipment.

In the foregoing step 305, before sending the D2D data, the user equipment reports, to the network device by using a BSR, the volume of the D2D data that needs to be sent by the user equipment in the logical channel group corresponding to the to-be-transmitted D2D data, so that the network device schedules, according to BSR information, the D2D resource that is used by the user equipment to transmit the D2D data.

In an LTE system, a resource needed for uplink data transmission is obtained by using a BSR. In step 305, reporting of data volumes corresponding to different logical channel groups is completed by using a BSR.

In a case in which the type of the D2D data is a service type, specifically, according to a specific allocation manner of the logical channel group in the foregoing step 304, that is, a logical channel 1 that carries D2D data of a voice service is allocated to a logical channel group 1, and a logical channel 2 that carries a data file service and a logical channel 3 that carries an SMS message service are allocated to a logical channel group 2, if there are two user equipments in the system, which are separately user equipment A and user equipment B, and assuming that at a particular moment, the user equipment A needs to send 200 k bit D2D data of a voice service and 100 k bit D2D data of a data file service, and the user equipment B needs to send 300 k bit D2D data of a voice service and 100 k bit D2D data of an SMS message service, the user equipment A reports to the network device in step 305 that a D2D data volume corresponding to the logical channel group 1 is 200 k bit, and a D2D data volume corresponding to the logical channel group 2 is 100 k bit; and the user equipment B reports to the network device in step 305 that a D2D data volume corresponding to the logical channel group 1 is 300 k bit, and a D2D data volume corresponding to the logical channel group 2 is 100 k bit.

In a case in which the type of the D2D data is a priority type, specifically, according to a specific allocation manner of the logical channel group in the foregoing step 304, if there are two user equipments in the system, which are separately user equipment A and user equipment B, and assuming that at a particular moment, the user equipment A needs to send 200 k bit D2D data whose priority is 1 and 100 k bit D2D data whose priority is 6, and the user equipment B needs to send 300 k bit D2D data whose priority is 3 and 100 k bit D2D data whose priority is 10, the user equipment A reports to the network device in step 305 that a D2D data volume corresponding to a logical channel group 1 is 200 k bit, and a D2D data volume corresponding to a logical channel group 2 is 100 k bit; and the user equipment B reports to the network device in step 305 that a D2D data volume corresponding to the logical channel group 1 is 300 k bit, and a D2D data volume corresponding to a logical channel group 3 is 100 k bit.

In the foregoing step 306, the network device may allocate the D2D resource to the user according to the data volume in the logical channel group that corresponds to the D2D data to be transmitted by the user equipment.

In a case in which the type of the D2D data is a service type, specifically, as described in step 305, the network device may learn that data to be transmitted in the logical channel group 1 is 200+300=500 k bit, and data to be transmitted in the logical channel group 2 is 100+100=200 k bit. In step 306, the network device may preferentially allocate a communications resource to the logical channel group 1 that carries transmission of the D2D data of a higher priority, so that the to-be-transmitted 500 k bit D2D data of a higher priority is transmitted. If there is still a remaining communications resource in the system, the network device then allocates a communications resource to the logical channel group 2.

In a case in which the type of the D2D data is a service type, specifically, as described in step 305, the network device may learn that data to be transmitted in the logical channel group 1 is 200+300=500 k bit, data to be sent in the logical channel group 2 is 100 k bit, data to be sent in the logical channel group 3 is 100 k bit, and no data is to be sent in the logical channel group 4. In step 306, the network device may preferentially allocate a communications resource to the logical channel group 1 that carries transmission of the D2D data of a higher priority, so that the to-be-sent 500 k bit D2D data of a higher priority is transmitted. If there is still a remaining communications resource in the system, the network device then allocates a communications resource to the logical channel group 2 and the logical channel group 3.

When a logical channel group in which a logical channel is located is determined, allocation may be performed according to a type of D2D data corresponding to the logical channel. Using a case in which the type of the D2D data is a service type as an example, a logical channel corresponding to voice data is allocated to one logical channel group, and a logical channel corresponding to SMS message data is allocated to another logical channel group. Allocation may also be performed according to a group number of a logical channel group. For example, there are three logical channel groups. A first logical channel group includes a logical channel corresponding to voice data, a second logical channel group includes a logical channel corresponding to SMS message data, and a third logical channel group includes a logical channel corresponding to a data file. When a D2D resource is to be allocated, a D2D resource may be preferentially allocated to a logical channel of the first logical channel group.

By using such allocation, when allocating a communications resource, the network device may preferentially allocate a resource to voice data according to a D2D data volume in a logical channel group corresponding to the voice data, thereby ensuring that D2D data of high urgency and of high importance can be reliably transmitted in a timely manner. A case in which the type of the D2D data is a priority type is similar, and details are not described herein.

Preferably, before step 306, the network device may configure a resource used for D2D communication for the user equipment, and may send resource configuration information of the configured resource to the user equipment by using a system message and/or dedicated signaling.

For the resource configuration, there may be two configuration manners: a sharing mode and a dedicated mode.

Figure 4:
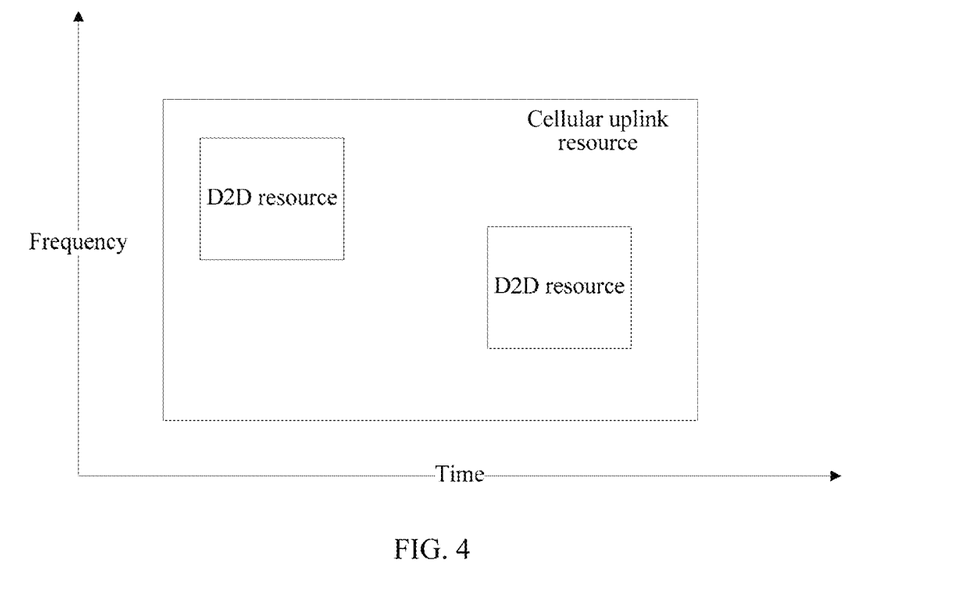
FIG. 4 is a schematic diagram of a resource sharing mode of D2D communication according to an embodiment of the present invention.

In the sharing mode, as shown in FIG. 4, a resource used for D2D communication falls within a range of resources that are allocated by the system initially to cellular uplink transmission, such as an uplink carrier or an uplink subframe of an LTE system, and the resource used for D2D communication is separated from the resource used for cellular uplink transmission in time or frequency. In the sharing mode, the resource configuration information includes frequency resource information and time resource information in the cellular uplink resource that are used for D2D communication, where the frequency resource information includes a frequency and a bandwidth in the cellular uplink resource that may be used for D2D communication, and the time resource information is a time period that may be used for D2D communication.

Figure 5:
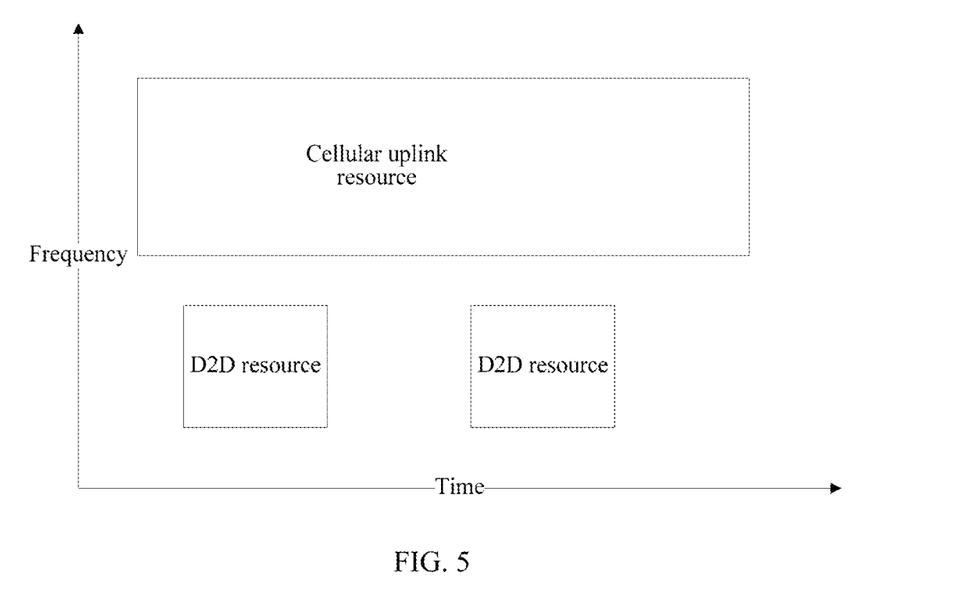
FIG. 5 is a schematic diagram of a resource dedicated mode of D2D communication according to an embodiment of the present invention.

In the dedicated mode, as shown in FIG. 5, a resource used for D2D communication falls outside a range of resources (such as an uplink carrier or an uplink subframe of an LTE system) that are allocated by the system initially to cellular uplink transmission, that is, a resource is specially allocated by the system to the D2D communication. In the dedicated mode, the resource configuration information includes carrier information and/or time information other than a cellular uplink resource that are used for D2D communication. The carrier information includes a frequency and a bandwidth that can be used for D2D communication other than the cellular uplink resource. For a time division system, the time information may be a time period in which a carrier of the system can be used for D2D communication. Because in the dedicated mode, a D2D communications resource does not overlap with the cellular uplink resource, the D2D communication and cellular uplink transmission do not interfere with each other.

In the step of configuring, by the network device, a resource used for D2D communication for the user equipment, the network device may send D2D communications resource configuration information to the user equipment when the user equipment is powered on to perform attachment, or when a service area of the user equipment changes. The network device may also regularly send the resource configuration information or the network device sends the resource configuration information according to a network occupation status as needed. A person skilled in the art may make a selection according to a specific application scenario, and details are not described herein.

In a case in which before step 306, there is a step of configuring, by the network device, resource configuration information used by the user equipment for D2D communication, in step 306, a D2D resource that is allocated by the network device to each user falls within a range of D2D communications resources configured by the network device.

In the foregoing step 307, the user equipment sends, on the D2D resource that is allocated by the network device to the user equipment according to the D2D data volume, the to-be-sent D2D data to another user equipment by using the determined logical channel.

By using settings in the foregoing manners of this embodiment, no complex change needs to be made to user equipment and a network device. The network device can allocate a transmission resource to some D2D data according to a data volume corresponding to a type of D2D data to be sent by the user equipment, which greatly improves efficiency of D2D data transmission.

Embodiment 2

Embodiment 2 corresponds to Embodiment 1, and Embodiment 2 shows user equipment and a network device for performing a paging method of Embodiment 1.

The devices of Embodiment 2 of the present invention are described below with reference to FIG. 6 and FIG. 7.

Figure 6:
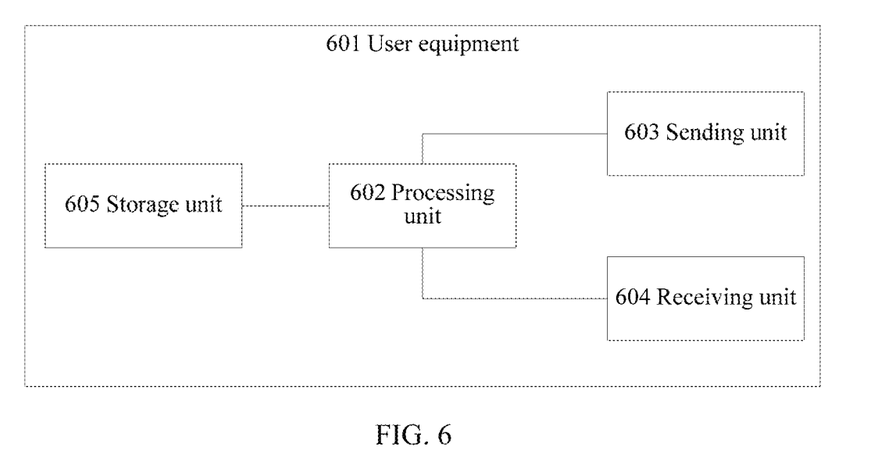
FIG. 6 is a schematic structural diagram of user equipment according to an embodiment of the present invention.

As shown in FIG. 6, the user equipment 601 includes: a processing unit 602, a sending unit 603, a receiving unit 604, and a storage unit 605.

Figure 7:
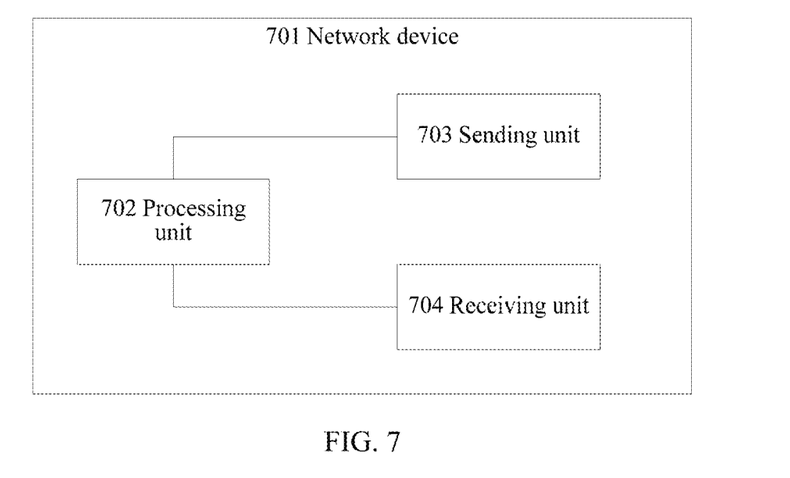
FIG. 7 is a schematic structural diagram of a network device according to an embodiment of the present invention.

As shown in FIG. 7, the network device 701 includes: a processing unit 702, a sending unit 703, and a receiving unit 704.

A person skilled in the art should understand that the processing unit 602 and the processing unit 702 may be processors, the sending unit 603 and the sending unit 703 may be transmitters, the receiving units 604 and 704 may be receivers, and the storage unit 605 may be a memory. The user equipment 601 and the network device 701 should further include another necessary component for completing communication functions of the user equipment 601 and the network device 701, such as a power supply unit. The foregoing component is independent of the present invention, and therefore is not described in detail herein.

Specifically, the network device 701 in FIG. 7 may be a base station or a core network device.

A particular quantity of types of D2D data are predefined in the system of the present invention. A type of the D2D data includes a service type and/or a priority type. For specific descriptions related to the service type and the priority type, refer to related content of Embodiment 1, and details are not described herein again. For example, type information of the D2D data may include a service type, that is, a voice service, a data file service, an SMS message service, or the like, or may include a priority type, that is, a priority 1, a priority 2, . . . , and a priority N, where N is an integer greater than 1.

The processing unit 602 of the user equipment 601 generates type information of to-be-sent D2D data according to a characteristic of to-be-sent data that is stored by the user equipment 601 in the storage unit 605.

The processing unit 602 transfers the generated type information of the to-be-sent D2D data to the sending unit 603, and the sending unit 603 provides, to the network device 701, the type information of the D2D data to be transferred by the network device. The receiving unit 704 of the network device 701 receives the type information of the D2D data that is uploaded by the user equipment 601, and transfers the type information of the D2D data to the processing unit 702.

In an actual application, the user equipment 601 may not report, to the network device 701, the type information of the D2D data that is to be sent by the user equipment 601. Alternatively, because of a transmission error, the type information reported by the user equipment 601 is not received by the network device 701. In this case, because all types of D2D data are already defined in the system, the network device may know all possible type information of D2D data to be transmitted by particular user equipment.

The processing unit 602 of the user equipment 601 is further configured to determine logical channels and logical channel groups that are used for D2D data of different types.

Allocation manners of the logical channel and the logical channel group may be respectively stored in first configuration information and second configuration information. The first configuration information includes a correspondence between the logical channel and the type information of the D2D data, and the second configuration information includes a correspondence between the logical channel group and the logical channel. The first configuration information and the second configuration information may be stored inside the user equipment 601, such as in the storage unit 605. Alternatively, the first configuration information and the second configuration information may be generated by the processing unit 702 of the network device 701, and are sent by the sending unit 703 to the user equipment 601 by using a system broadcast message and/or dedicated signaling, and the receiving unit 604 of the user equipment 601 receives the foregoing configuration information and transfers the configuration information to the processing unit 602. The specific allocation manners of the logical channel and the logical channel group are completely the same as those in step 302 and step 304 in Embodiment 1, and details are not described herein.

The processing unit 602 of the user equipment 601 determines, according to the first configuration information and a type of the D2D to be sent by the user equipment, the logical channel of the D2D data to be sent by the user equipment. The processing unit 602 is configured to determine, according to the second configuration information sent by the network device, the logical channel group corresponding to the logical channel.

In a case in which the user equipment 601 transfers the type information of the to-be-sent D2D data to the network device 701, the network device 701 may learn types of D2D data of all user equipments uploading type information of the to-be-sent D2D data. In this way, the processing unit 702 of the network device 701 may generate a piece of first configuration information according to a type status of the data type reported by the user equipment, and the sending unit 703 sends, by using a system broadcast message and/or dedicated signaling, the first configuration information to the user equipment. A logical channel group is allocated to the type of D2D data reported by the user equipment. In this case, the first configuration information includes a number of the configured logical channel. The receiving unit 604 of the user equipment receives the foregoing first configuration information and transfers the first configuration information to the processing unit 602. In a case in which the first configuration information is sent by the network device to the user equipment, the network device may further refer to a type of the user equipment. For example, the user equipment may be classified as an advanced user, a common user, or a low-level user, and different logical channels and/or different logical channel groups are allocated to different types of user equipments.

In addition, before the processing unit of the user equipment 601 determines the correspondence between the logical channel and the logical channel group, the processing unit 602 of the user equipment 601 may also generate, according to logical channels that are used for D2D data of different types and that are determined by the user equipment 601, type information of the logical channel. The type information of the logical channel includes at least one of the following information: an identifier of the logical channel, a priority of the logical channel, or a priority of data transmitted on the logical channel.

The processing unit 602 transfers the generated type information of the logical channel to the sending unit 603, and the sending unit 603 provides the type information of the logical channel of the user equipment to the network device 701. The receiving unit 704 of the network device 701 receives the type information of the logical channel uploaded by the user equipment 601, and transfers the type information of the logical channel to the processing unit 702.

In an actual application, the user equipment 601 may not report the type information of the logical channel to the network device 701. Alternatively, because of a transmission error, the type information of the logical channel that is reported by the user equipment 601 is not received by the network device 701. In this case, because logical channels that can be used when all types of D2D data is transmitted are already defined in the system, the network device may know logical channels that are to be used for all possible types of D2D data to be transmitted by particular user equipment. In this case, the network device may allocate a logical channel group to each type of logical channel.

In a case in which the user equipment 601 transfers the type information of the logical channel to the network device 701, the network device 701 may learn types of logical channels of all user equipments uploading type information of the logical channel. In this way, the processing unit 702 of the network device 701 may generate a piece of second configuration information according to the type information of the logical channel reported by the user equipment, and the sending unit 703 sends, by using a system broadcast message and/or dedicated signaling, the second configuration information to the user equipment. A logical channel group is allocated to a type of the logical channel reported by the user equipment. In this case, the second configuration information includes a number of the configured logical channel group. The receiving unit 604 of the user equipment receives the foregoing second configuration information and transfers the second configuration information to the processing unit 602. In a case in which the second configuration information is sent by the network device to the user equipment, the network device may further refer to a type of the user equipment. For example, the user equipment may be classified as an advanced user, a common user, or a low-level user, and different logical channels and/or different logical channel groups are allocated to different types of user equipments.

After the processing unit 602 of the user equipment 601 determines the logical channel group of the D2D data to be sent by user equipment 601, the processing unit 602 determines and generates a volume of the D2D data that needs to be sent by the user equipment in the logical channel group. The sending unit 603 reports, to the network device 701 by using a BSR, volumes of the D2D data that needs to be sent by the user equipment in different logical channel groups. The receiving unit 704 of the network device 701 receives BSR information and transfers the BSR information to the processing unit 702. The processing unit 702 schedules, according to the BSR information, a D2D resource that is used by the user equipment to transmit the D2D data. In an LTE system, a resource needed for uplink data transmission is obtained by using a BSR. A specific reporting operation of the sending unit 602 of the user equipment 601 is the same as that in step 305 of Embodiment 1, and details are not described herein.

After the receiving unit 704 of the network device 701 receives the BSR information and transfers the BSR information to the processing unit 702, the processing unit 702 allocates a D2D resource to each user according to a data type and a data volume of each user equipment. The processing unit 702 may allocate a D2D resource to the user equipment according to the D2D data volume and at least one of the type of the D2D data or a group number of the logical channel group. A specific D2D resource allocation operation is the same as that in step 306 of Embodiment 1, and details are not described again. Information about the foregoing allocated D2D resource is sent by the sending unit 703 of the network device 701 to the user equipment 601. Before the network device 701 allocates a D2D resource to the user equipment 601, the network device 701 may configure, by using the sending unit 703 by using a system message or dedicated signaling, resource configuration information used for D2D communication for the user equipment. For the resource configuration information, there are two configuration manners: a sharing mode and a dedicated mode. A specific configuration process and specific configuration content are completely the same as those in Embodiment 1, and details are not described again. In a situation that includes the step in which the network device 701 configures resource configuration information used for D2D communication for the user equipment 601, a D2D resource that is allocated by the network device 701 to each user falls within a range of D2D communications resources configured by the network device 701.

The receiving unit 604 of the user equipment 601 receives the D2D resource that is allocated by the network device to the user equipment 601, and transfers the D2D resource to the processing unit 602. The processing unit 602 controls D2D data stored in the storage unit 605. The sending unit 604 sends, on the D2D resource that is allocated by the network device 701 to the user equipment 601 according to the D2D data volume, the D2D data to another user equipment by using the determined logical channel. A receiving unit of the another user equipment may receive the foregoing D2D data on the allocated D2D resource.

A technical effect of this embodiment is the same as that of Embodiment 1, and no complex change needs to be made to user equipment and a network device. The network device can allocate a communications resource to some D2D data according to data volumes corresponding to data of different types reported by the user equipment, which greatly improves efficiency of D2D data transmission.

The present invention may be applied to a wireless communications system, and the wireless communications system includes user equipment and a network device.

Functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes instructions for instructing a computer device (which may be a personal computer, a server, or a network device) to perform all or a part of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

In the embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, it may be understood that the embodiments may be combined with each other without any conflict.

What is claimed is:

1. A data transmission method, comprising:
   transmitting, by user equipment to a network device, type information of to-be-transmitted Device to Device (D2D) data;
   receiving, by the user equipment from the network device, first configuration information, wherein the first configuration information comprises a corresponding relationship between different logical channels and corresponding type information of to-be-transmitted D2D data, wherein the type information indicates a service type or a priority type of the to-be-transmitted D2D data, and the corresponding relationship in the first configuration information indicates how different local channels correspond to D2D data of different service types or different priority types;

determining, according to the corresponding relationship in the first configuration information and the type information of to-be-transmitted D2D data, a logical channel used for the to-be-transmitted D2D data;

determining, by the user equipment, a logical channel group corresponding to the logical channel, wherein the determining, by the user equipment, the logical channel group corresponding to the logical channel comprises:

determining, by the user equipment according to second configuration information and a type of the logical channel, the logical channel group used by the logical channel, wherein the second configuration information comprises a correspondence between different logical channel groups and different types of logical channels;

after determining the logical channel group corresponding to the logical channel, reporting, by the user equipment to the network device, a D2D data volume of the logical channel group for the user equipment; and receiving, by the user equipment from the network device, a D2D resource that is allocated by the network device, wherein the D2D resource is used to transmit the to-be-transmitted D2D data.

2. The method according to claim 1, wherein
the second configuration information is stored in the user equipment; or
the second configuration information is received by the user equipment from the network device, wherein the second configuration information is determined by the network device according to the type of the logical channel.

3. The method according to claim 1, wherein the type of the logical channel is a priority of the logical channel.

4. A data transmission method in a Device to Device (D2D) system, comprising:

receiving, by a network device from user equipment, type information of to-be-transmitted D2D data;

in response to receiving the type information of the to-be-transmitted D2D data, sending, by the network device, first configuration information to the user equipment, wherein the first configuration information comprises a corresponding relationship between different logical channels and corresponding type information of to-be-transmitted D2D data, wherein the type information indicates a service type or a priority type of the to-be-transmitted D2D data, and the corresponding relationship in the first configuration information indicates how different local channels correspond to D2D data of different service types or different priority types;

sending, by the network device, second configuration information, wherein the second configuration information comprises a correspondence between different logical channel groups and different types of logical channels;

receiving, by the network device, a D2D data volume of a logical channel group for the user equipment, wherein the D2D data volume is reported by the user equipment, and the logical channel group comprises a logical channel that is used by the user equipment to send to-be-transmitted D2D data;

allocating, by the network device, a D2D resource to the user equipment according to the D2D data volume; and sending, by the network device, information about the D2D resource to the user equipment, wherein the D2D resource is used to transmit the to-be-transmitted D2D data.

5. An apparatus, comprising:
at least one processor, and a memory storing computer-executable instructions;
wherein the computer-executable instructions, when executed by the at least one processor, cause the apparatus to:

transmit type information of to-be-transmitted Device to Device (D2D) data;

receive first configuration information, wherein the first configuration information comprises a corresponding relationship between different logical channels and corresponding type information of to-be-transmitted D2D data, wherein the type information indicates a service type or a priority type of the to-be-transmitted D2D data, and the corresponding relationship in the first configuration information indicates how different local channels correspond to D2D data of different service types or different priority types;

determine, according to corresponding relationship in the first configuration information and the type information of to-be-transmitted D2D data, a logical channel used for the to-be-transmitted D2D data;

determine a logical channel group corresponding to the logical channel, wherein the determine the logical channel group corresponding to the logical channel comprises:

determine, according to second configuration information and a type of the logical channel, the logical channel group used by the logical channel, wherein the second configuration information comprises a correspondence between different logical channel groups and different types of logical channels;

after determining the logical channel group corresponding to the logical channel, report, to a network device, a D2D data volume of the logical channel group for the apparatus; and receive, from the network device, a D2D resource that is allocated by the network device, wherein the D2D resource is used to transmit the to-be-transmitted D2D data.

6. The apparatus according to claim 5, wherein
the second configuration information is stored in the memory; or
wherein the computer-executable instructions instruct the apparatus to: receive the second configuration information from the network device, the second configuration information being determined by the network device according to the type of the logical channel.

7. The apparatus according to claim 5, wherein the type of the logical channel is a priority of the logical channel.

8. A network device in a Device to Device (D2D) system, wherein the network device comprises:
at least one processor, and a memory storing computer-executable instructions;
wherein the computer-executable instructions, when executed by the at least one processor, cause the network device to:
receive, from user equipment, type information of to-be-transmitted D2D data;

in response to receiving the type information of the to-be-transmitted D2D data send first configuration information to the user equipment, wherein the first configuration information comprises a corresponding relationship between different logical channels and corresponding type information of to-be-transmitted D2D data, wherein the type information indicates a service type or a priority type of the to-be-transmitted D2D data, and the corresponding relationship in the first configuration information indicates how different local channels correspond to D2D data of different service types or different priority types;

send second configuration information, wherein the second configuration information comprises a correspondence between different logical channel groups and different types of logical channels;

receive a D2D data volume of a logical channel group for the user equipment, wherein the logical channel group comprises a logical channel that is used by the user equipment to send to-be-transmitted D2D data;

allocate a D2D resource to the user equipment according to the D2D data volume; and send, to the user equipment, information about the D2D resource, wherein the D2D resource is used by the user equipment to send the to-be-transmitted D2D data to another user equipment.

\* \* \* \* \*